United States Patent [19]

Smith et al.

[11] Patent Number: 4,467,895
[45] Date of Patent: Aug. 28, 1984

[54] SLACK ROPE DETECTING APPARATUS

[75] Inventors: Ernest B. Smith; Phillipus D. Slabbert; Bernardus J. Bout; Peter C. Vickers, all of Transvaal, South Africa

[73] Assignee: Crucible Society Anonyme, Luxembourg, Luxembourg

[21] Appl. No.: 387,480

[22] Filed: Jun. 11, 1982

[30] Foreign Application Priority Data

Jun. 15, 1981 [ZA] South Africa .................. 81/4014

[51] Int. Cl.³ ............................................. B66B 5/12
[52] U.S. Cl. ................................. 187/29 R; 318/475
[58] Field of Search ............... 187/29; 318/475, 476, 318/488

[56] References Cited

U.S. PATENT DOCUMENTS

| | | | |
|---|---|---|---|
| 647,242 | 4/1900 | Sprague | 187/29 |
| 1,132,770 | 3/1915 | Gale | 187/29 |
| 2,752,007 | 6/1956 | Doolan | 187/29 |
| 3,075,134 | 1/1963 | Manney | 318/475 X |
| 3,423,661 | 1/1969 | Gustafson | 318/475 |
| 3,778,694 | 12/1973 | Hubby et al. | 318/476 X |

FOREIGN PATENT DOCUMENTS 796142  1/1981  U.S.S.R. ...................... 187/29

*Primary Examiner*—B. Dobeck
*Assistant Examiner*—W. E. Duncanson, Jr.
*Attorney, Agent, or Firm*—Scully, Scott, Murphy & Presser

[57] ABSTRACT

A slack rope detecting apparatus for use in mine winding operations provides a trip signal via contacts 34 if the load in the rope falls below a predetermined value. The apparatus senses the load at each side of a sheave wheel using transducers 6 and 8 and uses a mean value of their outputs as an input to a summation amplifier 12. The weight of the rope between the sheave wheel is compensated for by monitoring rotation of the winding engine drum 42 and providing corresponding input signals for the amplifier 12. When the effective load in the rope falls below a predetermined value, set by input 28, a trip signal is produced. The trip signal output is preferably visually displayed and recorded.

8 Claims, 3 Drawing Figures

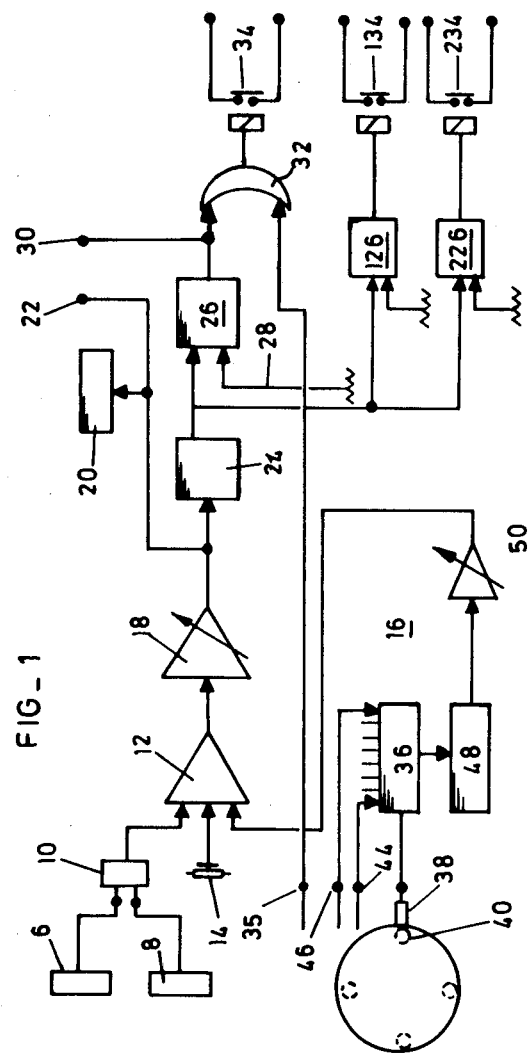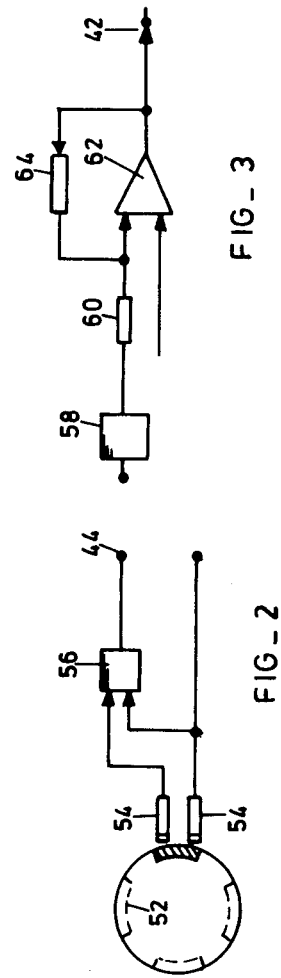

SLACK ROPE DETECTING APPARATUS

BACKGROUND TO THE INVENTION

The invention relates to slack rope detecting apparatus primarily for use in mining equipment.

Drum winders are used extensively in the mining world for the lowering and raising of men, material and ore, in shaft systems. When a cage does not travel at the same speed as the wire rope coming off the winder drum a slack rope develops.

Should sufficient slack rope be generated it is possible that the wire rope can become severely kinked, and either the rope itself or attachments between the wire rope and the cage can fail in tension due to severe overloading when the cage begins to fall freely, and is suddenly retarded when it has taken up all the slack in the rope that has been paid out.

There is also a problem in rope winding operations when starting a mine cage or mine car down a vertical shaft or incline in that the load may not immediately move or moves more slowly than anticipated. The winding engine can over-run the speed of the load and produce slackness in the rope. In extreme cases subsequent acceleration of the load takes up the slack and overstrains the rope or even breaks the rope or the anchoring between the rope and the load.

Slack ropes on winding plant can occur quite frequently and there have been several fatalities due at least in part to such occurrences.

Mechanical arrangements are already known for use in mining operations and domestic lifts which are generally arranged to jam the load if the load sticks and/or the rope slackens so that the overstrain or breakage mentioned above cannot occur.

It is an object of the invention to provide a slack rope detecting apparatus in the form of an electrical circuit arrangement which is generally more reliable and safer than earlier arrangements.

SUMMARY OF THE INVENTION

According to the invention there is provided a slack rope detecting apparatus for use in mine winding arrangements having a winding engine, the apparatus comprising means for monitoring the load in the rope and for producing electrical load signals corresponding thereto, and an electrical circuit means arranged to receive the load signals, and to produce a winding engine trip signal whenever the load signals fall below a predetermined value.

The means for monitoring may comprise means arranged to monitor the force applied by the rope on the head gear.

The means for monitoring may be arranged to monitor the force applied between the sheave wheel and at least one of its supports.

The apparatus preferably includes means for monitoring the length of rope between the end of the rope and the head gear and for providing signals for the electrical circuit corresponding to the weight of that rope, such that the value of the load signals can be suitably compensated for by the weight of that rope.

The means for monitoring the length of the rope may include means for monitoring the rotation of the winding engine rope drum.

The means for monitoring the load in the rope may be arranged to measure the strain at a connection between the end of the rope and a cage and includes signalling means for communicating the load signals to the electrical circuit.

The apparatus may be arranged to produce other signals such as a slack rope warning signal and an overload signal.

DESCRIPTION OF THE DRAWINGS

A slack rope detecting apparatus according to the invention will now be described by way of example with reference to the accompanying schematic drawings in which:

FIG. 1 is a circuit layout of the apparatus;

FIG. 2 shows a circuit layout of an alternative rotational directional detector; and FIG. 3 shows a circuit layout of a rotational directional detector.

DESCRIPTION OF A PREFERRED EMBODIMENT

Referring to the drawing, linear voltage displacement transducers 6 and 8 are mounted at each side of a sheave wheel under the sheave wheel bearings and generate voltage signals corresponding to the load supported by the sheave wheel. The voltage signals are combined by a circuit 10 and the mean value is supplied to a summation amplifier 12 which also receives signals from an adjustable voltage source 14 and a rope tracking signal generator 16. A scaling amplifier 18 provides in response to output signals from the amplifier 12 a scaled load signal which is supplied to a visual indicator 20 and a recorder terminal 22 and to a low-pass filter 24. A level detector 26 compares the output signal of the filter 24 with an adjustable input 28 and provides an output signal, whenever the output of the detector 26 falls below a pre-set value, to a trip-indicator input terminal 30 and one input of an OR-gate 32. Contacts 34, which form part of the safety circuit of the winding engine, are arranged to be opened by the output signal of the OR-gate 32. The other input of the OR-gate 32 is connected via a terminal 35 to a cage arrestor circuit, described in more detail below.

The output of the filter 24 is also supplied to detectors 126 and 226 which compare that output with different variable signals 128 and 228 respectively. When the output signal crosses thresholds set by signals 128 and 228 relay contacts 134 and 234 are closed. The closing of relay contacts 134 provides an indication of an overload in the rope and the closure of relay contacts 224 provide a slack rope warning signal indicative that the slack rope conditions which will cause a close-down, by closure of contacts 34, are being approached.

Conveniently the warning signal is provided visually to the driver who may be able to adjust the speed of the winding engine to avoid a close-down slack rope condition developing.

For calibrating purpose the mine cage is supported at the shaft surface and the voltage source 14 adjusted until a zero reading is obtained on the indicator 20. The supports are then removed and the scaling amplifier 18 is adjusted until a reading is obtained on the indicator 20 corresponding to the weight of the cage, say 3 tons. The input 28 is then set to a value corresponding to say 1½ tons.

Thereafter as the cage moves up and down in the shaft the total load is indicated on the indicator 20, this can be recorded by a chart recorder connected to the terminal 22, and if this load falls below 1½ tons the winding motor is tripped-out by the opening of contact 34.

Thus, the apparatus interrupts the operation of a winding engine whenever the load reduces to less than 1½ tons so that if the rope slackens the winding engine is tripped automatically. Thereafter, the operation of the winding engine is prevented until supervisory resetting of the winder safety circuit.

In a shallow shaft the apparatus so far described can work satisfactorily and although normal fluctuations in apparent load are experienced during acceleration and deceleration such fluctuations are generally too small to cause operation of the contact 34. Very short duration fluctuations caused by vibrations and side to side movements between the cage and its guides are removed by the filter 24 so as to prevent erroneous tripping-out of the winding engine.

Likewise, where the load is sensed at the bearings, say of a KOEPE drum winder or sensed at the connection between the rope and the cage, the apparatus so far described works satisfactorily. However, where the load is measured at the winding gear and the shaft is other than very shallow, compensation for the weight of the rope between the winding gear and the cage is normally required.

Referring again to FIG. 1, the tracking circuit 16 comprises an up/down counter 36 supplied with count signals from a proximity transducer 38. The transducer 38 generates signals in response to movement of four proximity elements 40 mounted on and displaced around the periphery of a winder rope drum 42. The up/down counter 36 is provided with a drum rotation direction signal supplied at terminal 44 and a zero-reset signal at terminal 46. The up/down counter 36 may be arranged to be re-set at the surface (or elsewhere in the shaft) to a value other than zero because even at the surface there will often be a certain length of rope between the sheave wheel and the cage. In such a case, application of the zero-reset signal is arranged to set the count at an initial count corresponding to that length of rope. The zero-reset signal may not be required at all but is provided in the described apparatus so that cumulative and usually small errors can be removed from the counter 36 as required from time to time.

As the cage moves up and down the shaft, the up/down counter 36 provides a digital summation signal corresponding to length of rope between the head gear and the cage. The digital signal is supplied via a digital-to-analogue convertor 48 and a scaling amplifier 50 to the summation amplifier 12 to provide a tracking signal. The tracking signal compensates for the weight of the rope between the head gear and the cage as the cage moves up and down. This means the apparatus not only provides an indication of the actual weight of the cage, at the indicator 20, but also means that the load below which a trip signal is generated by the apparatus is 1½ tons. If a tracking signal is not provided then the weight of the rope itself may approach or even exceed 1½ tons in a normal depth of shaft so that even if the rope becomes slack no trip signal is generated by the apparatus. If the sensitivity of the apparatus is reduced to overcome this, then trip signals could be generated during normal acceleration or deceleration.

It will be noted that the tracking signal may be applied directly to the level sensor 26, instead of to the amplifier 12, in which case the same compensation as before is provided. The arrangement described is normally preferred however because the indicator then provides an indication of the compensated load at the sheave wheel rather than the actual load.

In FIG. 2, the rope drum 42 is provided with four somewhat elongated proximity elements 52 arranged to be sensed by closely adjacent proximity detectors 54 which supply signals to a D-type flip-flop 56. The flip-flop 56, responding to the sequence of the signals are provided by the detector 54, gives a rotational direction signal to terminal 44. In FIG. 1, the rotational detector signal is conveniently provided by a forward/reverse winding engine selector but in some circumstances the cage is moved without energising the winding engine, by releasing the brakes for example, in which case the arrangement of FIG. 2 is clearly preferred.

As an alternative, a tachometer (not shown) mechanically coupled to the winding engine supplies an electrical directional-signal to a protection circuit 58. A differential amplifier 62 having a low level off-set feedback circuit provided by resistor network 60 and 64 receives the output of the circuit 58 and provides a rotational direction signal to the terminal 44 of FIG. 1.

One advantage of the apparatus described is that the driver of the winding engine is provided with an indication of the load on the rope at any time. During loading of the cage the driver can clearly see what load is being carried and with normal skill can even determine whether machinery or personnel are being loaded. Further, during acceleration and deceleration the driver may if he wishes adjust the rates thereof so as not to exceed comfortable or defined limits. The chart record provided by the chart recorder serves as a further indicating record for maintenance and supervisory use.

If there have been considerable or abnormal fluctuations in the load on the rope the record can show when, where and how often such fluctuations occur. This may indicate poor driving or incorrect speed control of the winding engine or inadequate shaft maintenance.

When loading and unloading heavy machinery from the cage special conditions apply for operation of the winding engine. For example, where such unloading takes place at levels below the surface the natural stretch in the rope due to the weight of the machinery is relieved as the load is removed so that during actual loading and unloading the cage may move several feet. To prevent this happening the cage is usually supported by cage arrestors (normally called "keps") at the unloading level and the rope slackened so that no load is carried by the rope therefore the cage cannot move when the machinery is removed. Great care is required and difficulty arises in slackening the rope at present because it is preferable to pay-out enough rope only to the extent necessary to reduce the load on the rope to zero. At different levels and with different ropes the amount of slackening required to reduce the tension by the correct amount varies.

A further advantage of the described apparatus is that such operations can be accurately and satisfactorily carried out and are not dependent on the depth at which unloading is taking place, the size of the rope or the weight of the machinery. When a cage arrestor is attached to the cage the contact 34 is maintained closed by a suitable signal applied to terminal 35. The driver of the winding engine can then, operate the driving engine until the load on the rope, as indicated on the indicator 20 or 30, reaches zero.

Where load signals are generated at the cage, in one such arrangement the signals are transmitted up the rope to a receiver at the surface, but other methods of communication may be used.

This slack rope detection, through an electrical circuit, immediately supplies a warning signal to the winding driver and simultaneously brings the winder to a standstill in the shortest possible time. Very basically the device senses and measures a load on the rope and when the actual load sensed becomes less than a predetermined value the device is actuated. Naturally, cognisance is taken in the change of the mass of the wire rope due to its varying length and as described a warning signal is provided so that if possible the driver can adjust the winding engine to avoid a slack rope trip.

Thus, it will be appreciated that the described apparatus while having its prime function of tripping the winding engine in case of a slack rope condition provides useful observation and monitoring signals for the aid of the driver and for use in supervision and maintenance, and for use during loading and unloading of heavy machinery.

It will be appreciated that a slack rope condition is unlikely to arise when hauling a cage to the surface and from a safety point of view the detecting apparatus can be disenabled at such times although the monitoring function particularly of overload still serves a purpose. It is however within the scope of the invention to provide an adjustable level or levels for operation of the contacts 34 and/or contacts 134 and 234. The trip level and other levels may be made functions of speed and direction of the winding engine, being made less sensitive at high speed and inoperable during raising the cage, for example. Further the trip level can be arranged to be set higher for higher loads which in effect enables a more sensitive setting for smaller loads.

In the described arrangement the length of rope between the cage and the head gear is determined by monitoring rotation of the winding engine drum. In other arrangements the length of the rope can be achieved by other methods, including monitoring at least intermittently the position of the cage in the shaft.

We claim:

1. A slack rope detecting apparatus for use in mine winding arrangements having a winding engine, a head gear including a sheave wheel supported in the head gear, the apparatus comprising means for monitoring the load in the rope and for producing first electrical load output signals corresponding thereto, said means for monitoring including means arranged to monitor the force applied by the rope on the head gear, said means for monitoring being arranged to monitor the force applied between the sheave wheel and at least one of its supports, and an electrical circuit means including comparator means arranged to receive the load output signals and compare the output signals with a predetermined value and to produce a winding engine trip signal whenever the load output signals fall below a predetermined value.

2. A slack rope detecting apparatus according to claim 1, including means for monitoring the length of rope between the end of the rope and the head gear and for providing compensating signals for the electrical circuit corresponding to the weight of that rope, means for combining the load signals and the compensating signals so as to reduce the load signals by the compensating signals as the length of the rope increases before the load signals are supplied to the comparator means.

3. A slack rope detecting apparatus according to claim 2, in which the means for monitoring the length of the rope include means for monitoring the rotation of the winding engine.

4. A slack rope detecting apparatus according to claim 1, in which the means for monitoring the load in the rope comprises means arranged to measure the strain at a connection between the rope and a cage supported by the rope and includes signalling means for communicating the load signals to the electrical circuit.

5. A slack rope detecting apparatus according to claim 1, in which the electrical circuit is arranged to adjust said predetermined value according to at least one of the speed of the rope, the direction of movement of the rope and the magnitude of a load carried in the cage.

6. A slack rope detecting apparatus according to claim 1, in which the electrical circuit is arranged to provide a second output signal whenever the load signals in the rope reduces to a value towards the predetermined value but greater than said value, said second output signal comprising a slack rope warning signal.

7. A slack rope detecting apparatus according to claim 6, in which the electrical circuit is arranged to provide a third output signal whenever the load signals exceed a predetermined value, which third signal comprises an overload signal.

8. A slack rope detecting apparatus for use in mine winding arrangements including a winding engine, head gear including a sheave wheel supported in the head gear by supports at each side of the sheave wheel, a rope extending between the winding engine and a cage, the apparatus comprising measuring means for measuring the force at each support and providing corresponding electrical load signals, circuit means for combining said load signals and providing mean values thereof, monitoring means for monitoring the length of the rope between the head gear and the cage and providing electrical compensating signal corresponding to the weight of that rope, circuit means for receiving the mean load signals and the compensating signals arranged to reduce the effective load signals by the compensating signals as the length of the rope between the head gear and the cage increases, comparator circuit means arranged to compare the effective load signals with a predetermined value and to produce winding engine trip signals whenever the effective load signals fall below that value.

* * * * *